Sept. 30, 1958
F. B. FREYDL
2,853,932
VENTILATING ATTACHMENT FOR VEHICLES
Filed June 22, 1953
2 Sheets-Sheet 1
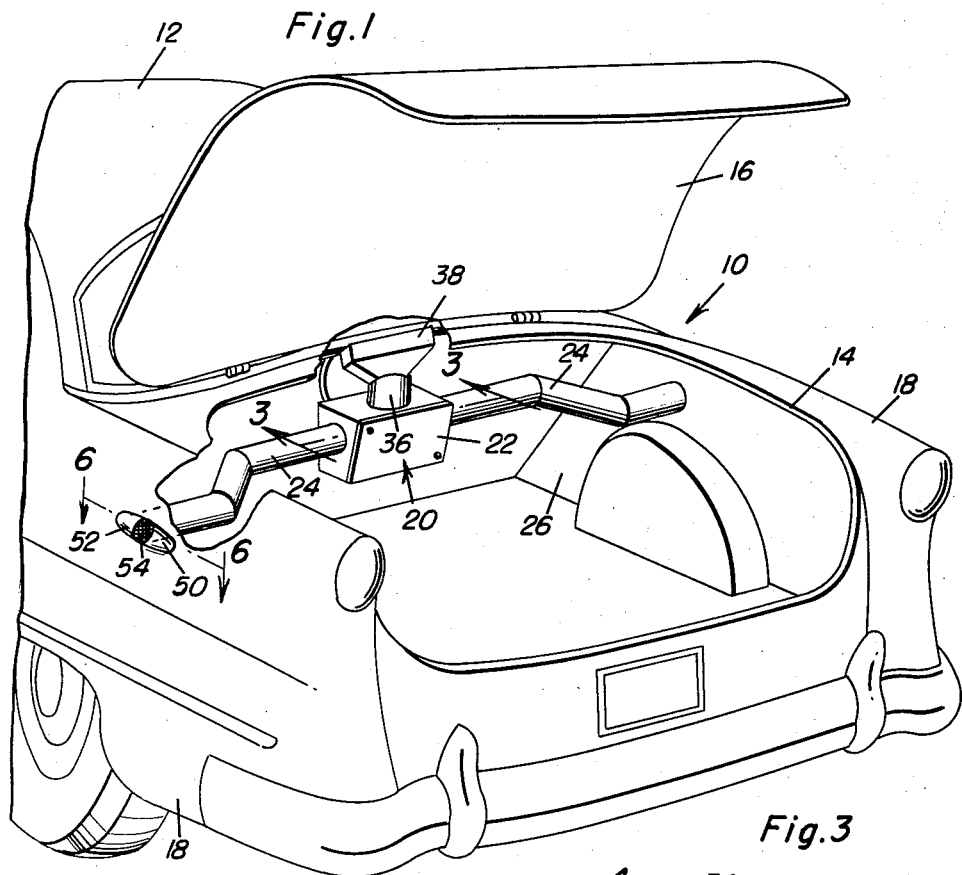
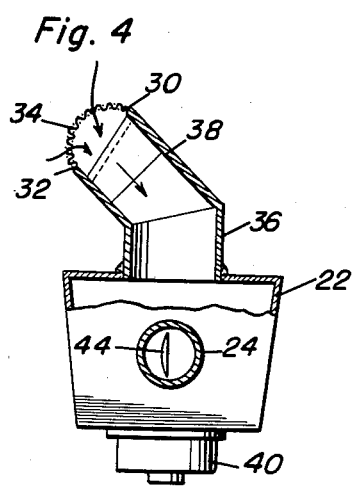
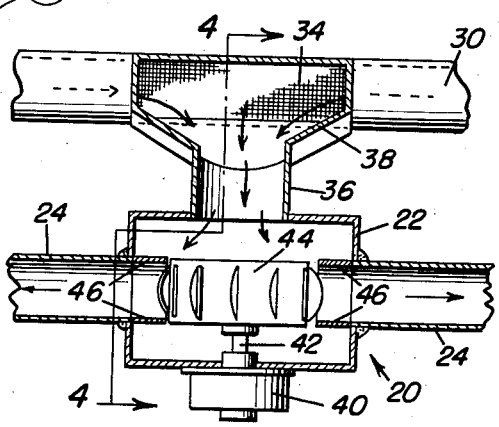
Frank B. Freydl
INVENTOR.

Sept. 30, 1958   F. B. FREYDL   2,853,932
VENTILATING ATTACHMENT FOR VEHICLES
Filed June 22, 1953   2 Sheets-Sheet 2

Frank B. Freydl
INVENTOR.

BY *Clarence A. O'Brien*
and *Harvey B. Jacobson*
Attorneys

United States Patent Office 2,853,932
Patented Sept. 30, 1958

2,853,932

VENTILATING ATTACHMENT FOR VEHICLES

Frank B. Freydl, Northville, Mich.

Application June 22, 1953, Serial No. 363,085

1 Claim. (Cl. 98—2)

This invention relates in general to improvements in ventilators, and more specifically to a mechanical unit which will complete directional air evacuation from a generation location from within a closed car to a point of location at exterior of car.

While modern cars have been provided with elaborate air intake systems in order to attempt to properly ventilate them, the interiors of such cars are not properly ventilated and the windows steam. Also, inasmuch as modern cars are relatively air tight the stale air disposed therein is not forced out with the result that he incoming air merely increases the pressure within the interior of the body. It is therefore highly desirable to provide means for conveniently removing the stale air from the interior of a vehicle body so as to facilitate the circulation of air therethrough.

It is the primary object of this invention to provide an improved ventilator for vehicle bodies which is conveniently mounted for exhausting air therefrom, the ventilator is so mounted whereby it does not hinder the appearance of the vehicle.

Another object of this invention is to provide an improved exhaust ventilator for vehicle bodies, said exhaust ventilator being of a construction whereby the same may be conveniently installed in vehicles of all designs including those previously manufactured.

Another object of this invention is to provide an improved exhaust ventilator for vehicles which is of a relatively simple construction and formed of readily obtainable material so as to be economically feasible.

A further object of this invention is to provide an improved exhaust system for closed vehicle bodies, said exhaust system being mounted in the rear of the vehicle body so as to cooperate with air intake means at the forward end of the body to facilitate circulation of air through the body and down over a rear window thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary rear perspective view of the vehicle having mounted therein the vehicle ventilator which is the subject of this invention, the trunk hood of the vehicle being open in order to clearly illustrate the position of the ventilator, portions of the vehicle body being broken away;

Figure 3 is an enlarged fragmentary sectional view taken substantially upon the plane indicated by the section line 3—3 of Figure 1 and shows the construction of blower means for the ventilator;

Figure 4 is a fragmentary sectional view taken substantially upon the plane indicated by the section line 4—4 of Figure 3 and shows the relationship of the blower housing with respect to the air intake;

Figure 2:
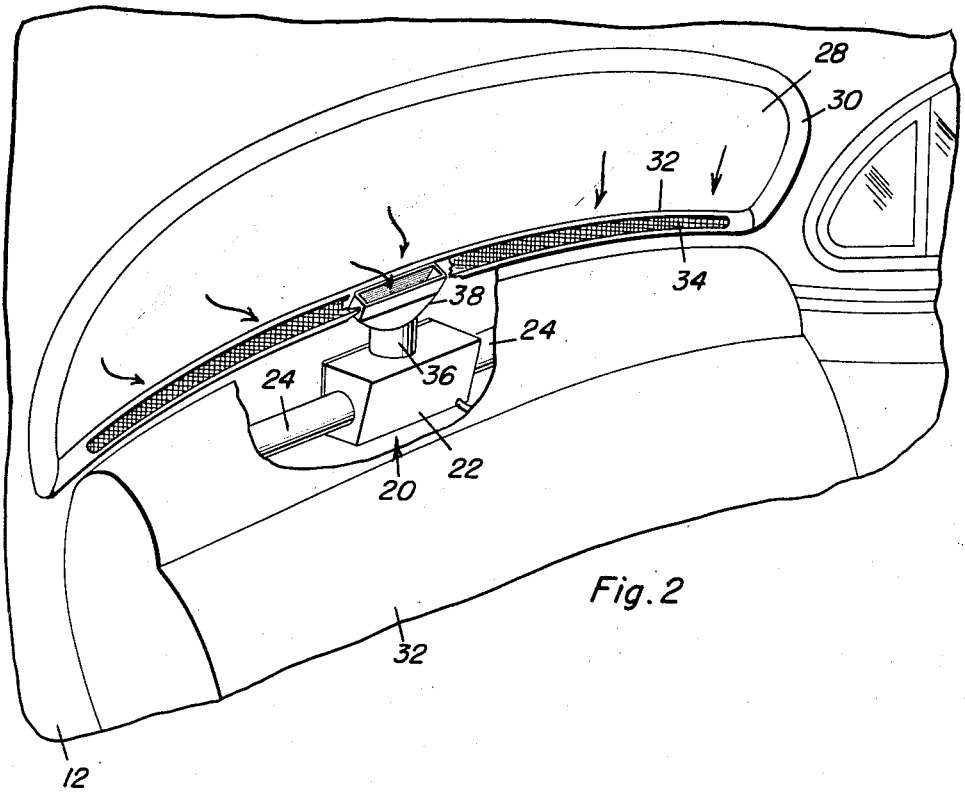
Figure 2 is a fragmentary perspective view of the interior of the vehicle body at the rear thereof and shows the intake for the ventilator, portions of the rear seat of the vehicle being broken away in order to clearly illustrate the ventilator.

Referring now to the drawings in detail, it will be seen that there is illustrated a vehicle which is referred to in general by the reference numeral 10. The vehicle 10 includes a closed body 12 and a trunk 14, the trunk 14 having a trunk lid 16. Attached to opposite sides of the trunk 14 are rear fenders 18. Disposed within the trunk and communicating with the interior of the vehicle body 12 is an exhaust ventilator which is referred to in general by the reference numeral 20.

The exhaust ventilator 20 includes a generally rectangular housing 22 which has connected to opposite sides thereof opposed exhaust ducts 24. The exhaust ducts 24 are communicated with the interior of the housing and extend through side walls 26 of the trunk 14. It will be noted that the exhaust ducts 24 are angular in order to have their outer ends positioned with respect to the fenders 18.

Referring now to Figure 2 in particular, it will be seen that the vehicle body 12 includes a rear window 28 which includes a window molding 30. The vehicle body 12 also has a rear seat 32 which is disposed immediately below the window 28.

The lower portion of the window molding 30 is provided with an elongated opening 32 therein which is protected by a suitable grille 34. The opening 32 forms an inlet opening for the ventilator 20. Connected to the rear side of the window molding 30, the window molding being concave in cross section, is an air inlet duct 36 which has an upper funnel shaped portion 38, the funnel shaped portion being connected directly to the window molding 30 and being communicated with the interior thereof. The lower end of the air inlet duct 36 is connected to an upper side of the housing 22 and communicates with the interior thereof.

Carried by the bottom wall of the housing 22 is an electric motor 40. The electric motor 40 may be connected to a battery (not shown) of the vehicle 10 and controlled by a switch (not shown) mounted on a dash of the vehicle. The motor 40 has a shaft 42 which extends upwardly into the interior of the housing 22, the shaft having mounted thereon a squirrel cage type blower 44. The blower 44 rotates between spaced shroud rings 46 which control the flow of air into and out of the blower, the shroud rings being generally annular in outline.

Figure 5:
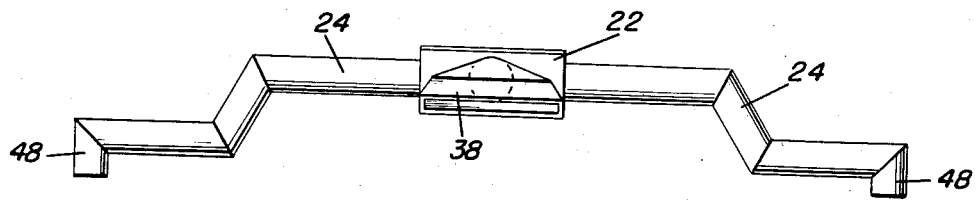
Figure 5 is a top plan view of the duct work of the ventilator, the duct work being disposed exteriorly of the vehicle.
Figure 6:
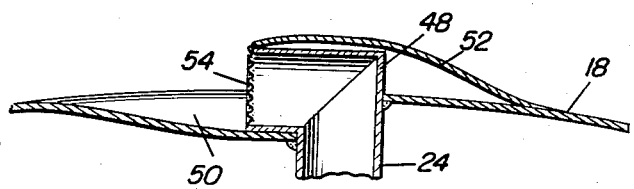
Figure 6 is an enlarged fragmentary sectional view taken substantially upon the plane indicated by the section line 6—6 of Figure 1 and shows the construction of an exhaust fitting and its relationship to a fender of the vehicle.

Referring now to Figures 5 and 6 in particular, it will be seen that the exhaust duct 24 terminates in rearwardly directed end fittings 48. The end fittings 48 are partially disposed within semi-circular cross sectional recesses 50 in the rear fenders 18. In order to facilitate flow of air past the end fittings 48, the same are provided with streamlined housings 52 which are carried by the fenders 18. In order that insects may be prevented from entering the fittings 48, the exit ends thereof are closed by a suitable screen 54.

In operation, the blower 44 draws air from the rear portion of the interior of the body 12 down through the opening 32 into the air intake fitting 36. The air then passes into the housing 22 where it is forced into the exhaust ducts 24. The air then escapes through the fittings 48 of the exhaust ducts to the exterior of the vehicle 10, It will be understood that movement of the vehicle 10 will create a vacuum at the exit ends of the fittings 48 so as to facilitate the escape of air therefrom.

It will be understood that when the ventilator 20 is mounted in the vehicle together with its conventional intake system air will enter through the front of the vehicle body 12 and out through the rear thereof. This will cause a circulation throughout the body 12 to properly ventilate the same. In this manner the stale air normally found in vehicle bodies will be removed and the steam normally found on the windows thereof eliminated due to the proper ventilation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A ventilator for a closed vehicle body having a trunk comprising an intake in the rear of said body, blower means mounted in said trunk and communicated with said intake, an exhaust duct extending out through a side of said trunk connected to said blower means, said body having a fender, said exhaust duct extending through said fender, said fender having a recessed portion, said exhaust duct including an elbow which is formed of a transverse leg and a longitudinal leg, said longitudinal leg opening rearwardly and being partially seated within said recessed portion, said longitudinal leg opening into said recessed portion, and a streamlined housing secured to said fender and covering said longitudinal leg, said streamlined housing facilitating the flow of exhaust air through said elbow.

References Cited in the file of this patent

UNITED STATES PATENTS

| | | |
|---|---|---|
| 2,083,059 | Fageol | June 8, 1937 |
| 2,171,622 | Calkins | Sept. 5, 1939 |
| 2,189,406 | Roberts | Feb. 6, 1940 |
| 2,248,329 | Bell | July 8, 1941 |
| 2,263,723 | Findley | Nov. 25, 1941 |
| 2,302,202 | Freydl | Nov. 17, 1942 |
| 2,304,691 | Hund | Dec. 8, 1942 |
| 2,670,671 | Haltenberger | Mar. 2, 1954 |